United States Patent
Iwahashi et al.

(10) Patent No.: US 8,918,668 B2
(45) Date of Patent: Dec. 23, 2014

(54) INTERFACE CIRCUIT, INVERTER DEVICE, INVERTER SYSTEM, AND TRANSMITTING AND RECEIVING METHOD

(75) Inventors: Koji Iwahashi, Fukuoka (JP); Hidetoshi Ryu, Fukuoka (JP); Satoshi Sueshima, Fukuoka (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 120 days.

(21) Appl. No.: 13/411,644

(22) Filed: Mar. 5, 2012

(65) Prior Publication Data

US 2012/0166857 A1 Jun. 28, 2012

Related U.S. Application Data

(63) Continuation of application No. PCT/JP2010/062684, filed on Jul. 28, 2010.

(30) Foreign Application Priority Data

Sep. 9, 2009 (JP) ................................. 2009-208420

(51) Int. Cl.
*G06F 1/12* (2006.01)
*H02M 7/48* (2006.01)

(52) U.S. Cl.
CPC ... *G06F 1/12* (2013.01); *H02M 7/48* (2013.01)
USPC ........................................ 713/400; 713/322

(58) Field of Classification Search
USPC ......... 713/1, 2, 100, 300, 310, 320, 321, 322, 713/323, 324, 330, 340, 375, 400, 500; 370/350, 464; 375/224, 354
See application file for complete search history.

(56) References Cited

U.S. PATENT DOCUMENTS

| | | | | |
|---|---|---|---|---|
| 5,038,065 | A | * | 8/1991 | Matsubayashi et al. ...... 310/162 |
| 5,404,459 | A | * | 4/1995 | Gulick et al. ................... 710/61 |
| 5,495,358 | A | * | 2/1996 | Bartig et al. .................. 398/202 |

(Continued)

FOREIGN PATENT DOCUMENTS

| | | |
|---|---|---|
| DE | 4342377 | 6/1995 |
| EP | 0660209 | 6/1995 |

(Continued)

OTHER PUBLICATIONS

International Search Report for corresponding International Application No. PCT/JP2010/062684 Oct. 12, 2010.

(Continued)

*Primary Examiner* — Kim Huynh
*Assistant Examiner* — Paul J Yen
(74) *Attorney, Agent, or Firm* — Mori & Ward, LLP

(57) ABSTRACT

An interface circuit includes a general-purpose CPU configured to transmit a clock to a serial encoder with which bidirectional serial communication of clock synchronization type is to be performed, the CPU being configured to transmit and receive data to and from the serial encoder; and an additional circuit configured to detect a start bit of reception data transmitted from the serial encoder. The general-purpose CPU starts counting the number of bits of the reception data in response to a detection signal from the additional circuit, the detection signal indicating the detection of the start bit. The CPU stops transmitting the clock to the serial encoder upon completion of counting a predetermined number of bits of the reception data.

2 Claims, 2 Drawing Sheets

(56) References Cited

U.S. PATENT DOCUMENTS

| | | | |
|---|---|---|---|
| 5,713,028 A | * | 1/1998 | Takahashi et al. ............ 713/322 |
| 5,760,707 A | | 6/1998 | Katagiri |
| 2006/0186852 A1 | | 8/2006 | Sasaki et al. |

FOREIGN PATENT DOCUMENTS

| | | |
|---|---|---|
| JP | 07-014091 | 1/1995 |
| JP | 08-054254 | 2/1996 |
| JP | 2004-264038 | 9/2004 |
| WO | 97/36245 | 10/1997 |

OTHER PUBLICATIONS

Written Opinion for corresponding International Application No. PCT/JP2010/062684 Oct. 12, 2010.

Chinese Office Action for corresponding CN Application No. 201080038978.7, Mar. 5, 2014.

Krah et al., "Resource Optimized BiSS Master Interface for High Resolution Encoders", PCIM Europe, Jun. 6, 2006, pp. 479-484, XP055122683.

Extended European Search Report for corresponding EP Application No. 10815225.7-1807, Jun. 23, 2014.

* cited by examiner

INTERFACE CIRCUIT, INVERTER DEVICE, INVERTER SYSTEM, AND TRANSMITTING AND RECEIVING METHOD

CROSS REFERENCES TO RELATED APPLICATIONS

The present application is a continuation application of PCT/JP2010/062684, filed Jul. 28, 2010, which claims priority to Japanese Patent Application No. 2009-208420, filed Sep. 9, 2009. The contents of these applications are incorporated herein by reference in their entirety.

BACKGROUND OF THE INVENTION

1. Field of the Invention

The present invention relates to an interface circuit, an inverter device, an inverter system, and a transmitting and receiving method.

2. Description of the Related Art

A servo driver in a servo control device has been disclosed. The servo driver includes an encoder signal processor and a drive controller. The encoder signal processor processes an encoder output signal and generates positional information of an actuator. The drive controller servo-controls the actuator in accordance with a signal from the encoder signal processor (see, e.g., Japanese Unexamined Patent Application Publication No. 2004-264038 (pages 4 and 5)).

The servo driver is centered on a computer which includes a central processing unit (CPU), a read-only memory (ROM), and a random-access memory (RAM). The encoder signal processor used here is one which is modularized as an encoder signal processing integrated circuit (IC). The encoder signal processor processes the encoder output signal and outputs the resulting parallel signal which represents positional information of the actuator to the drive controller. Thus, in the servo driver of the related art described above, the encoder signal processing IC is used as the encoder signal processor to process serial data input to a receiving section.

In the encoder signal processor of the related art described above, a signal processing application-specific IC (ASIC) is used which is specifically designed as an interface to an encoder. This leads to a higher cost of individual devices or a longer period of development.

The present disclosure has been made in view of the problems described above. The present disclosure provides an interface circuit, an inverter device, an inverter system, and a transmitting and receiving method that are low-cost and can be developed in a shorter period of time.

SUMMARY OF THE INVENTION

According to an aspect of the present disclosure, an interface circuit is provided which includes a general-purpose CPU configured to transmit a clock to a serial encoder with which bidirectional serial communication of clock synchronization type is to be performed, the CPU being configured to transmit and receive data to and from the serial encoder; and an additional circuit configured to detect a start bit of reception data transmitted from the serial encoder. The CPU starts counting the number of bits of the reception data in response to a detection signal from the additional circuit, the detection signal indicating the detection of the start bit. The CPU stops transmitting the clock to the serial encoder upon completion of counting a predetermined number of bits of the reception data.

According to another aspect of the present disclosure, an inverter device is provided which includes an interface circuit configured to transmit and receive data to and from a serial encoder through bidirectional serial communication of clock synchronization type, the serial encoder being configured to detect a position of a motor whose rotational position or speed is to be controlled; and a computing circuit configured to perform computation on the basis of a detection signal received through the interface circuit, the detection signal indicating the detected position of the motor, the computation being performed to control the rotational position or speed of the motor. The interface circuit includes a general-purpose CPU configured to transmit a clock to the serial encoder and transmit and receive data to and from the serial encoder, and an additional circuit configured to detect a start bit of reception data transmitted from the serial encoder. The CPU starts counting the number of bits of the reception data in response to a detection signal from the additional circuit, the detection signal indicating the detection of the start bit. The CPU stops transmitting the clock to the serial encoder upon completion of counting a predetermined number of bits of the reception data.

According to another aspect of the present disclosure, an inverter system is provided which includes a motor having a serial encoder that detects a position, and an inverter device configured to control a rotational position or speed of the motor. The inverter device includes an interface circuit configured to transmit and receive data to and from the serial encoder through bidirectional serial communication of clock synchronization type; and a computing circuit configured to perform computation on the basis of a detection signal received through the interface circuit, the detection signal indicating the detected position of the motor, the computation being performed to control the rotational position or speed of the motor. The interface circuit includes a general-purpose CPU configured to transmit a clock to the serial encoder and transmit and receive data to and from the serial encoder, and an additional circuit configured to detect a start bit of reception data transmitted from the serial encoder. The CPU starts counting the number of bits of the reception data in response to a detection signal from the additional circuit, the detection signal indicating the detection of the start bit. The CPU stops transmitting the clock to the serial encoder upon completion of counting a predetermined number of bits of the reception data.

According to another aspect of the present disclosure, a transmitting and receiving method is provided which includes detecting a start bit of reception data transmitted from a serial encoder with which bidirectional serial communication of clock synchronization type is to be performed; and stopping a clock upon completion of counting a predetermined number of bits of the reception data, the clock being transmitted from a general-purpose CPU to the serial encoder.

DESCRIPTION OF THE EMBODIMENTS

Figure 1:
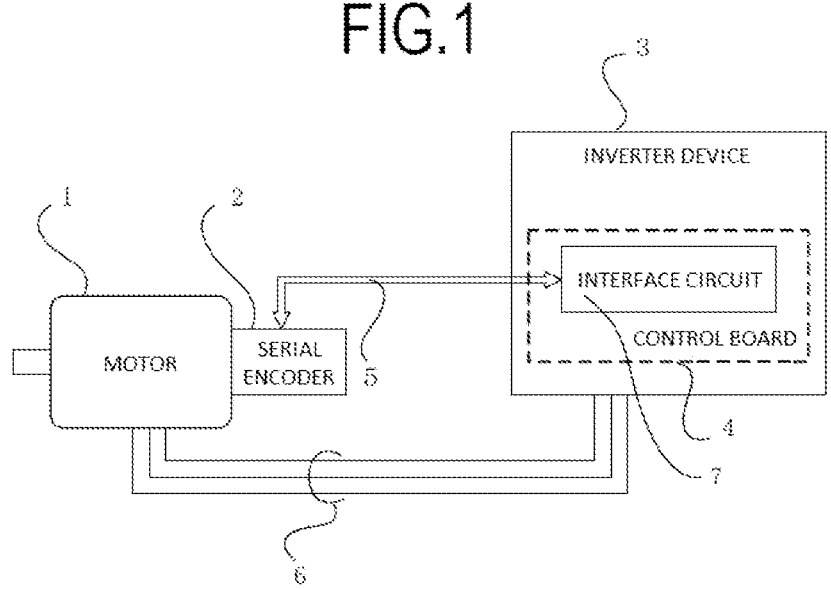
FIG. 1 schematically illustrates a configuration in which a motor speed is controlled using an inverter device equipped with an interface circuit according to a first embodiment of the present disclosure.

Embodiments of the present disclosure will now be described in detail with reference to the attached drawings. In the present specification and drawings, components having substantially the same functions are represented by the same reference numerals in principle. A redundant description of these components will be omitted.

First Embodiment

An inverter device equipped with an interface circuit according to a first embodiment of the present disclosure will be described. FIG. 1 schematically illustrates a configuration in which a motor speed is controlled using an inverter device equipped with an interface circuit according to the first embodiment.

As illustrated in FIG. 1, an inverter system according to the present embodiment includes a motor 1 and an inverter device 3. To control a rotational position or speed of the motor 1, the inverter device 3 is configured to be capable of transmitting and receiving data to and from a serial encoder 2 that detects the rotational position and speed of the motor 1.

The inverter device 3 includes a main circuit (not shown) and a control board 4. The control board 4 generates a control signal for driving elements on the main circuit in accordance with a detection signal from the serial encoder 2. An interface circuit 7 is mounted on the control board 4. The interface circuit 7 is connected through a signal line 5 to the serial encoder 2 and performs bidirectional serial communication of clock synchronization type with the serial encoder 2. The main circuit (not shown) of the inverter device 3 is connected through motor lines 6 to the motor 1, and supplies the motor 1 with a power source having a variable voltage and a variable frequency.

Figure 2:
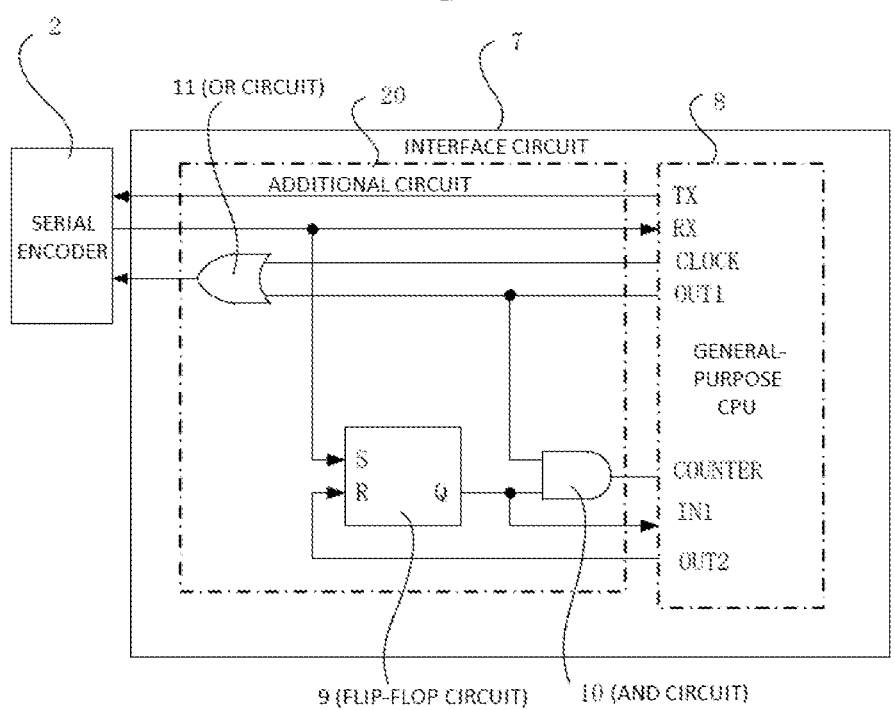
FIG. 2 is a circuit diagram of the interface circuit according to the first embodiment.

Next, the interface circuit 7 according to the present embodiment will be described with reference to FIG. 2. FIG. 2 is a circuit diagram of the interface circuit 7 according to the present embodiment.

As illustrated in FIG. 2, the interface circuit 7 includes a general-purpose CPU 8 and an additional circuit 20. The additional circuit 20 includes a flip-flop circuit 9, an AND circuit 10, and an OR circuit 11.

Figure 3:
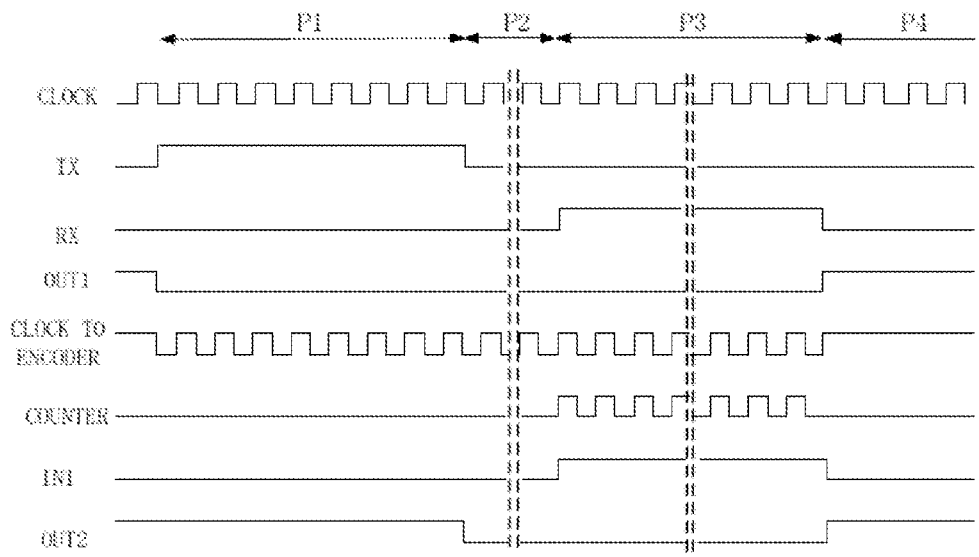
FIG. 3 is a timing diagram illustrating an operation of the interface circuit according to the first embodiment.

An operation of the interface circuit according to the present embodiment will be described with reference to FIG. 2 and FIG. 3. FIG. 3 is a timing diagram illustrating an operation of the interface circuit according to the present embodiment.

(1) Period P1

In FIG. 3, a period P1 is a period of time during which command transmission from the CPU 8 to the serial encoder 2 takes place.

In the period P1, the CPU 8 outputs a CLOCK signal to the serial encoder 2 and outputs about eight bits of transmission data (TX) in synchronization with the CLOCK signal. The CLOCK signal is transmitted through the OR circuit 11. As illustrated in FIG. 2, the CLOCK signal from the CPU 8 is connected to one input of the OR circuit 11, and the other input of the OR circuit 11 is connected to an OUT1 terminal of the CPU 8. By driving a signal of the OUT1 terminal low simultaneously with the start of transmission of the transmission data (TX), the CPU 8 starts transmitting the CLOCK signal to the serial encoder 2.

(2) Period P2

In FIG. 3, a period P2 is a period of time during which, after completion of command transmission from the CPU 8 to the serial encoder 2, the CPU 8 waits for a start bit of the reception data (RX).

The reception data (RX) transmitted from the serial encoder 2 is connected to an RX terminal of the CPU 8 and also to an S terminal (set input terminal) of the flip-flop circuit 9. An R terminal (reset input terminal) of the flip-flop circuit 9 is connected to an OUT2 terminal of the CPU 8. In the period P2 after completion of command transmission from the CPU 8 to the serial encoder 2, the CPU 8 drives a signal of the OUT2 terminal from high to low, cancels the reset of the flip-flop circuit 9, and waits for a start bit of the reception data (RX). The reception of about eight bits of data is repeated until the reception data (RX) goes high (until a start bit comes in). The data received before the start bit comes in is discarded.

(3) Period P3

In FIG. 3, a period P3 is a period of time during which the reception data (RX) transmitted from the serial encoder 2 is received.

The reception data (RX) is input to the S terminal of the flip-flop circuit 9 in the additional circuit 20. When a start bit added to the beginning of the reception data (RX) is detected, the flip-flop circuit 9 is triggered by the start bit to drive an output Q high. The flip-flop circuit 9 inputs, to an IN1 terminal of the CPU 8, a signal notifying that the reception data (RX) has been transmitted from the serial encoder 2. At the same time, the AND circuit 10 inputs a CLOCK signal to a COUNTER terminal of the CPU 8.

The CPU 8 has a counter. The CPU 8 detects the length of the reception data (RX) by counting the CLOCK signal. The reception data (RX) is a signal synchronized with the CLOCK signal. Therefore, by counting the CLOCK signal, the number of bits of the reception data (RX) can be counted and the reception data (RX) of a predetermined data length can be received. Note that the length of the reception data (RX) is set before communication takes place.

(4) Period P4

In FIG. 3, a period P4 is a period of time during which the reception data (RX) is processed.

When the reception data (RX) of a predetermined data length is received in the period P3, the CPU 8 drives the OUT1 terminal high to stop transmission of the CLOCK signal to the serial encoder 2. At the same time, the CPU 8 drives the OUT2 terminal high to reset the flip-flop circuit 9, and disables the transmission of the reception data (RX) to the flip-flop circuit 9. Then, the CPU 8 processes the reception data (RX) input in the period P3.

The data processing involves looking for a start bit while shifting the reception data (RX), and storing data following the start bit in a RAM (not shown). The data stored in the RAM is transmitted to the control board 4 as a signal which indicates a rotational position of the motor 1.

The interface circuit 7 and the like according to the first embodiment have been described. The interface circuit 7 is composed of the general-purpose CPU 8 and the additional circuit 20 that detects a start bit (rising edge or starting point) of reception data from the serial encoder 2. Thus, according to the present embodiment, where the general-purpose CPU 8 can be used by using a simple additional circuit, the interface circuit 7 serving as an interface to the serial encoder 2 can be realized which is low-cost and can be developed in a short period of time.

The additional circuit 20 may include the flip-flop circuit 9 which is set by a start bit and is reset upon completion of counting a predetermined number of bits of reception data.

Thus, the general-purpose CPU 8 can be used to receive a signal from the serial encoder 2. According to the present embodiment, it is thus possible to further reduce the cost of the interface circuit 7.

The additional circuit 20 may include a gate circuit (e.g., OR circuit 11) and may stop transmission of the CLOCK signal to the serial encoder 2 in response to a clock stop signal from the CPU 8 upon completion of receiving reception data. Thus, transmission of a signal from the serial encoder 2 can be stopped with a simple circuit. Therefore, according to the present embodiment, transmission and reception of data to and from the serial encoder 2 can be controlled at a low cost.

Second Embodiment

Figure 4:
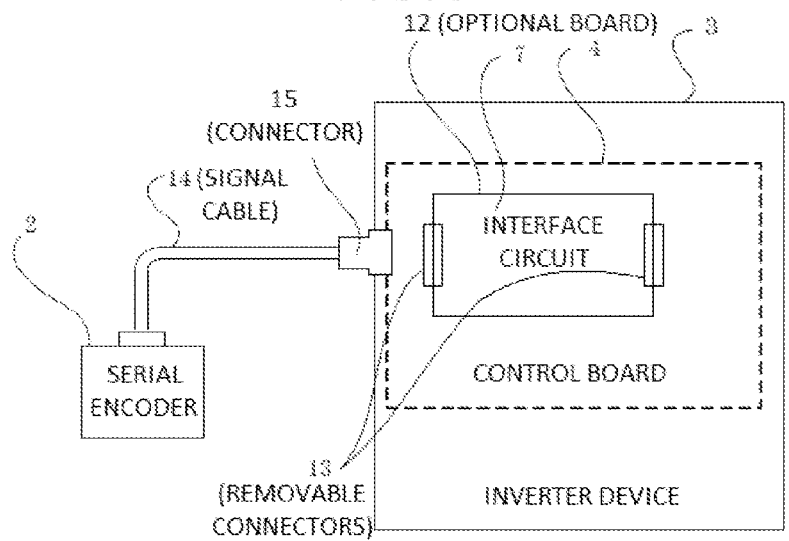
FIG. 4 illustrates a configuration of an inverter device according to a second embodiment of the present disclosure.

An inverter device which includes an interface circuit according to a second embodiment of the present disclosure will be described with reference to FIG. 4. FIG. 4 illustrates a configuration of an inverter device according to the second embodiment. Differences from the first embodiment will be described here. A redundant description of the same configurations as those of the first embodiment will be omitted.

As illustrated in FIG. 4, the inverter device 3 according to the present embodiment may include an optional board 12 which includes the interface circuit 7. The optional board 12 is equipped with removable connectors 13 electrically connected to the control board 4. That is, unlike the interface circuit 7 of the first embodiment formed directly on the control board 4, the interface circuit 7 of the present embodiment is formed on a board removable from the control board 4. Therefore, the inverter device 3 of the present embodiment allows individual replacement of the interface circuit 7.

The serial encoder 2 and the control board 4 are connected to each other by a signal cable 14 and a connector 15. The serial encoder 2 and the interface circuit 7 are connected to each other through the control board 4 by the connectors 13.

The interface circuit 7 and the like according to the second embodiment have been described. The interface circuit 7 may be formed on the independent optional board 12 that can be selected depending on the type of the motor 1. Then, the optional board 12 with the interface circuit 7 formed thereon may be mounted on the control board 4 of the inverter device 3. Thus, in addition to providing the functional effect of the first embodiment, the present embodiment allows the optional board 12 including the interface circuit 7 formed thereon to be individually replaced depending on the type of the motor 1. This can reduce the cost of, and the development time for, the inverter device 3.

Embodiments of the present disclosure have been described in detail with reference to the attached drawings. It is to be understood, however, that the scope of the technical idea of the present disclosure is not limited to the embodiments described above. It will be obvious that those having general knowledge in the technical field of the present disclosure can come up with the idea of making various changes, modifications, and combinations within the scope of the technical idea of the present disclosure described in the appended claims. Therefore, it is to be understood that techniques obtained by making such changes, modifications, and combinations are also within the scope of the technical idea of the present disclosure.

For example, in the embodiments described above, the interface circuit 7 includes the general-purpose CPU 8 equipped with a counter and the additional circuit 20, which includes the flip-flop circuit 9, the AND circuit 10, and the OR circuit 11. However, the additional circuit 20 is not limited to this example. The additional circuit 20 may be anything which can start counting the number of bits of reception data from a start bit, and can stop transmitting a clock to the serial encoder 2 upon completion of counting a predetermined number of bits of reception data.

What is claimed is:

1. An inverter device comprising:
    an interface circuit configured to transmit and receive data to and from a serial encoder through bidirectional serial communication of clock synchronization type, the serial encoder being configured to detect a position of a motor whose rotational position or speed is to be controlled; and
    a computing circuit configured to perform computation on the basis of a detection signal received through the interface circuit, the detection signal indicating the detected position of the motor, the computation being performed to control the rotational position or speed of the motor,
    wherein the interface circuit includes
        a general-purpose CPU configured to transmit a clock to the serial encoder and transmit and receive data to and from the serial encoder, and
        an additional circuit configured to detect a start bit of reception data transmitted from the serial encoder, the additional circuit includes a flip-flop circuit which is set and triggered to output a detection signal upon receipt of the start bit by the flip-flop circuit from the serial encoder;
    the CPU starts counting the number of bits of the reception data in response to the detection signal from the additional circuit, the detection signal indicating the detection of the start bit; and
    the CPU stops transmitting the clock to the serial encoder upon completion of counting a predetermined number of bits of the reception data.

2. An inverter system comprising:
    a motor having a serial encoder that detects a position; and
    an inverter device configured to control a rotational position or speed of the motor,
    wherein the inverter device includes
        an interface circuit configured to transmit and receive data to and from the serial encoder through bidirectional serial communication of clock synchronization type, and
        a computing circuit configured to perform computation on the basis of a detection signal received through the interface circuit, the detection signal indicating the detected position of the motor, the computation being performed to control the rotational position or speed of the motor;
    the interface circuit includes
        a general-purpose CPU configured to transmit a clock to the serial encoder and transmit and receive data to and from the serial encoder, and
        an additional circuit configured to detect a start bit of reception data transmitted from the serial encoder, the additional circuit includes a flip-flop circuit which is set and triggered to output a detection signal upon receipt of the start bit by the flip-flop circuit from the serial encoder;
    the CPU starts counting the number of bits of the reception data in response to the detection signal from the additional circuit, the detection signal indicating the detection of the start bit; and
    the CPU stops transmitting the clock to the serial encoder upon completion of counting a predetermined number of bits of the reception data.

* * * * *